Patented Aug. 26, 1941

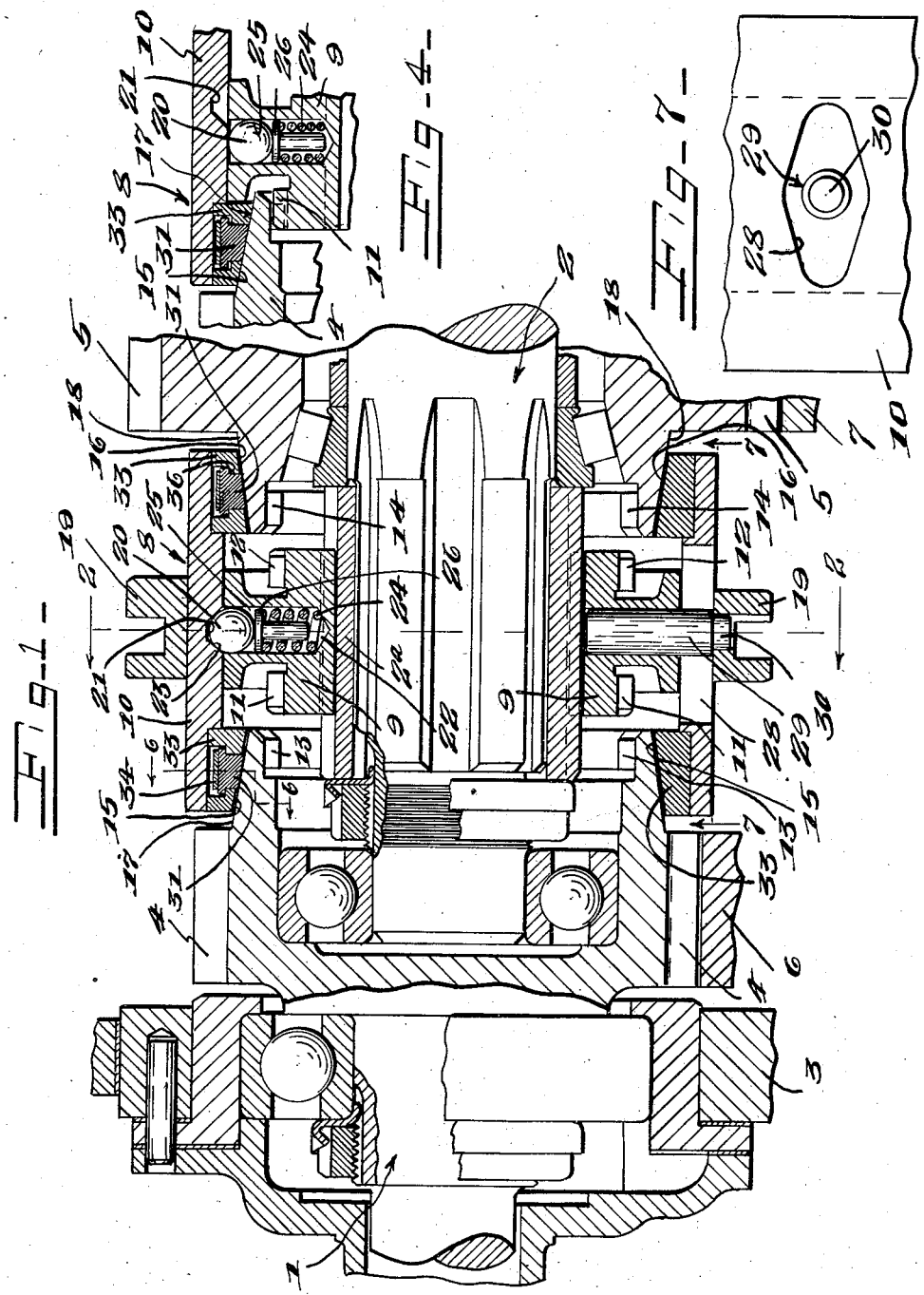

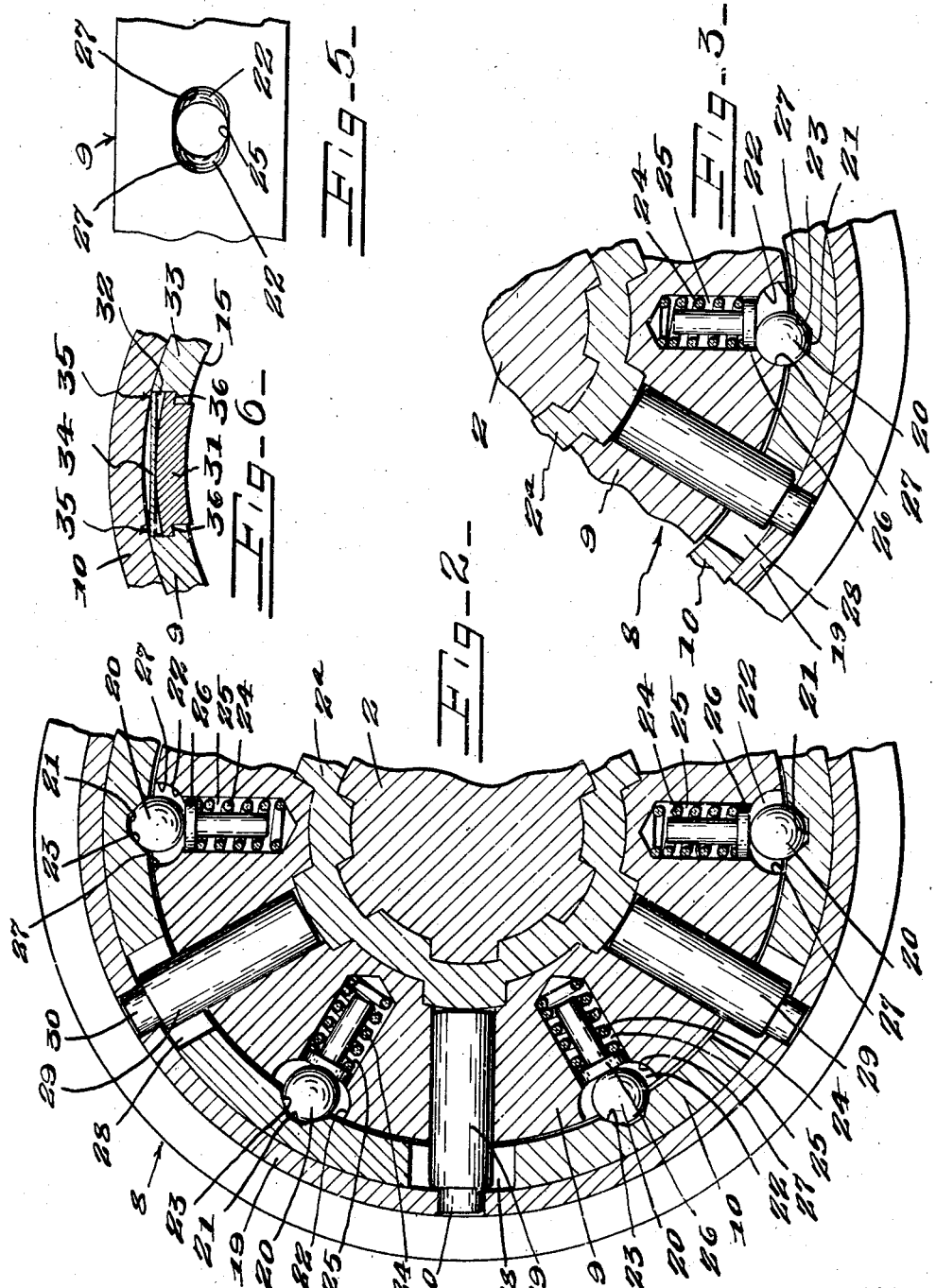

2,253,578

UNITED STATES PATENT OFFICE 2,253,578

SYNCHRONIZING CLUTCH

Carl D. Peterson, Edward W. Zingsheim, and Robert R. Burkhalter, Toledo, Ohio

Application April 20, 1939, Serial No. 268,972

12 Claims. (Cl. 192—53)

This invention relates to synchronizing clutches of the type including driving and driven members, one of which is shiftable axially into and out of engagement with the other, which members have complemental toothed and friction clutch faces and the shiftable member includes a section provided with the toothed clutch face and a section provided with the friction clutch face, the sections being shiftable axially as a unit and the toothed section shiftable axially relatively to the friction section, when the friction section is shifted into engaged position and the speeds of the drive and driven members have been synchronized.

In synchronizing clutches of this type, the sections, in addition to the relative axial shifting movement, have a relative rotary movement, within limits. The relative rotary movement controls detent or blocking-out means which prevent relative axial movement of the sections, while the friction section is performing its synchronizing operation and permits the shifting movement of the toothed section relative to the friction section only after synchronization has been established through the friction section. In clutches of this type heretofore, one means, instrumentality or set of instrumentalities, as a spring-pressed plunger or plungers has been used to yieldingly couple the two sections together, so that they shift as a unit, and another means, instrumentality or set of instrumentalities, as cam posts, used to effect the blocking of relative axial shifting of the sections until the synchronization has been established.

This invention has for its object a single means, instrumentality or set of instrumentalities for effecting both the yielding coupling of the sections of the shiftable clutch member together and also the blocking-out operation until synchronization is established through the friction section. More specifically, it has for its object spring-pressed parts, as balls, between the toothed and friction sections of the shiftable clutch member, which normally function to cause said sections to shift as a unit until synchronization is established through the friction section, these balls positively blocking the shifting of the toothed section relative to the friction section until synchronization is established and shifting into position to permit the shifting-in of the toothed section after synchronization is established through the friction section.

Other minor objects appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is a longitudinal sectional view of the clutch with contiguous portions of the transmission mechanism in which it may be installed being shown.

Figure 2 is an enlarged fragmentary sectional view on line 2—2, Figure 1.

Figure 3 is a fragmentary view similar to Figure 2 showing the blocking-out operation of the balls, before synchronization of the speeds of the driving and driven members is established.

Figure 4 is a fragmentary sectional view of parts seen in Figure 1 showing the position of the balls when the toothed clutch section is shifted into complete engagement.

Figure 5 is a fragmentary plan view of one of the elongated recesses in which the balls are located.

Figure 6 is a fragmentary sectional view taken on the plane of line 6—6, Figure 1.

Figure 7 is a fragmentary elevation of the friction element or sleeve of the synchronizing clutch showing one of the lengthwise slots therein and the radial post of the friction section therein.

This invention comprises a single means in the type of synchronizing clutch referred to for connecting the sections of the shiftable clutch sections together, so that they initially shift as a unit until the friction faces of the clutch members engage, and for blocking shifting of the toothed section relative to the friction section, until the speeds of the driving and driven members of the clutch have been synchronized through the friction section.

The invention is here shown as embodied in the clutch between the drive shaft and the transmission shaft of a transmission gear. It will be understood, however, that the clutch may be used in any other situation. The clutch is also shown as of double construction, but it is apparent that the invention may be embodied in a clutch of single construction.

1 designates the drive shaft of a transmission gearing, and 2 the driven or transmission shaft. The drive shaft is mounted in suitable bearings in a wall 3 of the gear box. The shaft 2 is shown as having a pilot bearing in the shaft 1 or in a gear 4 usually formed integral with the shaft 1. The transmission shaft 2 is mounted in the usual manner in another wall of the gear box. 5 is a gear mounted on the transmission shaft 2 and normally rotatable about the same. The gears 4 and 5 constitute driving members for driving the shaft 2 through the synchronizing clutch through different gear ratios. The gear 4 meshes with a gear 6 on the counter shaft of the transmission and the gear 5 with another gear 7 on the counter shaft.

The synchronizing clutch in the gearing here illustrated operates, when shifted in one direction from neutral, to connect the shafts 1, 2 together in direct drive relation and when shifted in opposite directions in indirect drive relation through the gears 4, 6 and 7 and the counter shaft on which they are mounted, and the gear 5.

8 designates the synchronizing clutch as a whole. It consists of concentrically arranged friction and toothed sections, one mounted on the other, and in the illustrated embodiment of our invention, the inner section 9 is the toothed section, and the outer section 10, the friction section. As the clutch here illustrated is of the double construction type and shiftable in opposite directions from neutral, the inner section 9 is formed with sets of jaws or clutch teeth 11 and 12 on opposite sides thereof for coacting with complemental clutch teeth or jaws 13, 14 on the opposing faces of the gears 4, 5 respectively, and the outer friction section 10, which is in the form of a sleeve, is provided with friction faces 15, 16 which coact with complemental friction sections 17, 18 on the gears 4, 5 respectively. The inner or toothed section 9 is slidably splined to a sleeve 2ᵃ which in turn is splined on the shaft 2 and held from axial movement thereon. The clutch is shifted by suitable mechanism coacting with a shifting collar 19 surrounding the section 10 but slidable thereon and connected to the inner toothed section 9.

The single yielding means for performing the two functions of yieldingly connecting the sections together, so that they initially shift as a unit until the friction faces engage, and of blocking relative axial shifting, that is, shifting of the toothed section relatively to the friction section to bring the toothed section into engagement with the teeth 13 or 14 of the driving member 4 or 5 until the speeds of the driving and driven members have been synchronized, comprises a radially and circumferentially shiftable part or sets of parts, each part located partly in a socket which it substantially fits in one of the sections and in a radially alined recess in the other section of greater length, in a circumferential direction, than the socket, but of the same width in an axial direction as the socket, and resilient means, as a spring for pressing said part radially into the socket and permitting said part to be cammed out of the socket when said part is located in the central portion of the elongated recess, the end portions of the recess constituting stops for preventing radial movement of said part, when said part is located in either one or the other of the recess or out of alinement with the spring means. The part is shifted into one end or the other of the recess while the friction section is performing its synchronizing functi and is moved back into the central portion of the recess where it can yield radially when the synchronization is established.

In the illustrated embodiment of our invention, these parts are spring-pressed balls 20 and the outer section or sleeve 10 is formed with a set or series of sockets 21 in its inner face, and the inner toothed section 9 is formed with peripheral recesses 22. The sockets 21 are usually circular with inclined or cam-shaped sides 23. The balls are spring loaded or pressed radially into the recesses 21 by any resilient means, here shown as coiled springs 24 arranged in radial bores 25 formed in the inner section 9 and opening through the central portions of the recesses 22, the springs thrusting at their inner ends against the bottoms of the bores and at their outer ends against the heads 26 of plungers located in the bores. The heads 26 thrust against the balls 20 when the balls are in central position in the recess. The end portion of each recess 22 provides stops at 27 against which the ball thrusts when out of central position, as seen in Figure 3. The stops 27 thus block inward radial shifting of the balls, and hence lock the inner section 9 from shifting axially relatively to the friction section or the sleeve 10. The balls are carried into one end or the other of the recesses 22, or into a position, such as shown in Figure 3, before synchronization is completed through the friction section 10, and when synchronization is completed, there is no longer any circumferential resistance between the sections 9 and 10, and hence the balls center, or are not restrained from returning to central position, as shown in Figure 2. When synchronization is established, the section 9 can then be shifted axially relatively to the friction section 10 and the balls assume their positions shown in Figure 4.

The friction section or sleeve 10 is mounted on the peripheral surface of the inner toothed section 9 and is provided with lengthwise slots 28 which receive radial posts or pins 29 on the toothed section 9. The posts 29 extend through the slots and are coupled to the shifting collar 19. The posts are here shown as formed with reduced ends 30 fitting into openings in the shifting collar 19. As here shown, the posts or pins 29 are located in radial bores in the toothed section 9.

Heretofore, in this type of synchronizing clutches, the slots 28 have had parallel sides and provided with notches on opposite sides of their intermediate portions and the radial pins or posts have coacted with the end walls of the notches with a camming action, and in so doing perform the function of blocking relative axial movement of the toothed and friction sections, until the speeds have been synchronized through the friction section. In this clutch, each slot 28 instead of being formed with parallel sides is formed with its sides diverging from the ends of the slot toward the intermediate portion of the slot, and the post or pin 29 coacts with the tapered side walls cam fashion, after the speeds are synchronized, and hence axial shifting of the inner section 9 relative to the outer sleeve section 10 permitted, and the unlocking action of the balls 20 effected, upon synchronization of the speeds.

In operation, when shifting force is applied to the collar 19, say to the left (Figure 1) the friction face 15 is first brought into frictional engagement with the friction face 17 of the gear 4, first rotating the sleeve 10 in one direction or the other relative to the section 9, a maximum distance determined by the difference in widths of the slot 28 and pin 29, and this relative rotation carries the balls 20 from central position, as shown in Figure 2, into a position similar to that shown in Figure 3, or where relative axial shifting of the sections 9, 10 is prevented, until the speeds are synchronized, by reason of the balls 20 being held from inward radial movement by the stops 27. Continued pressure applied to the shifting collar will increase the pressure between the friction faces 15 and 17 and effect synchronization of the speeds between the gear 4 and the shaft 2. When synchronization is accomplished, the force is removed tending to hold the balls in engagement with the stops 27, so that continued shifting pressure with no resistance in a circumferential direction tends to carry the balls back to central position (Figure 2), where they are alined with the heads 26 of the spring-pressed plungers. Continued shifting pressure applied to the collar 19 will cause the balls to be cammed out of the socket 21, and hence to yield inwardly as shown in Figure 4, into position to permit shifting of the section 9 relative to the sleeve section 10, and hence permit shifting of the teeth 11 into engagement with the teeth 13. The operation is similar when the clutch 8 is shifted to the right from neutral into engagement to engage the teeth 12 with the teeth 14 of the gear 5.

As here shown, the friction section 10 is provided with spring-pressed shoes 31 (Figures 1 and 6) located in radial bores 32 in the ring 33 on which the face 15 or 16 is provided, the shoes normally projecting beyond the face 15 or 16, as seen in Figure 6 and being yieldable into a position flush with the face 15 or 16, as the friction face 15 or 16 comes into full engagement with the friction face 17 or 18. The shoe is here shown as pressed outwardly by a leaf spring and preferably a flat spring 34 anchored at 35 at its ends and pressing at its intermediate portion on the intermediate or apex portion of the arcuate inner side of the shoe 31. As here shown, the bore in which the shoe is located opens through the peripheral face of the friction ring 33 and the spring thrusts at its ends against the opposite walls of the bore in which the shoe 31 is located, and is held from displacement by the inner face of the sleeve 10 around the ring, it being understood that the ring is tightly fitted in the end of the sleeve or body 10 and that the shoes and springs are assembled in the ring 33 before the ring is applied to the sleeve 10. Also, the shoes are held from inward radial displacement by inter-engaging shoulders 36 on the shoes and the walls of the bore, these shoulders being provided by counterboring the ring from the outer side thereof. The shoes are normally slightly off the friction face 17 or 18 and upon initial shifting engage the friction face 17 or 18 in advance of the friction face 15 or 16, and finally come into a position flush with the friction face 15 or 16, as said face comes into full frictional pressure with the friction face 17 or 18.

The shoes 31 engage the friction face of the gear 4 or 5 with a light friction sufficiently to rotate the sleeve 10 in one direction or the other relatively to the toothed section 9, and in so doing, shift the sleeve section 9 circumferentially to cause the balls 20 to lock the sleeve from further axial movement, until the speeds are synchronized. These spring-pressed shoes therefore perform the function of initially engaging the friction face of the gear 4 or 5 in advance of the friction face of the sleeve 10 and of the gear 4 or 5. This feature, however, together with the feature of supporting the sleeve 10 centrally thereof instead of at its ends form the subject matter of the application of Carl D. Peterson. Serial No. 267,272 filed April 11, 1939.

What we claim is:

1. In a synchronizing clutch member for clutches of the type including driving and driven members, one of which is shiftable axially into and out of engagement with the other, said members having complemental toothed and friction clutch faces and the shiftable member including inner and outer concentric sections, one being mounted on the other, and one section being provided with a toothed clutch face and the other being a friction section provided with the friction clutch face, said sections being shiftable as a unit and the toothed section shiftable axially relatively to the friction section when the friction section is shifted into engaged position, said sections being also mounted to have relative rotary movement, within limits, and rotatably shiftable into a predetermined radial relation by the synchronization of the speeds, and shifting means acting on the toothed section; the combination of yielding coupling means between the sections including a radial and circumferentially movable part, one of the sections being formed with a socket substantially fitting said part and the other with a recess of greater length in a circumferential direction than the socket and substantially the same width as the socket in an axial direction, said part being arranged partly in both the socket and the recess, and resilient means for pressing said part radially into the socket, when the sections are in said predetermined radial relation, said resilient means and said part being shiftable out of coacting position by the relative rotary shifting while the speeds are synchronizing.

2. In a synchronzing clutch member for clutches of the type including driving and driven members, one of which is shiftable axially into and out of engagement with the other, said members having complemental toothed and friction clutch faces and the shiftable member including concentric sections, one being mounted on the other, and one section being provided with a toothed clutch face and the other being a friction section being provided with the friction clutch face, said sections being shiftable as a unit and the toothed section shiftable axially relatively to the friction section when the friction section is shifted into engaged position, said sections being also mounted to have relative rotary movement, within limits, and rotatably shiftable into a predetermined radial relation by the synchronization of the speeds, and shifting means acting on the toothed section; the combination of a coupling part between the sections, yielding means normally pressing said parts into coupling position, stops for holding said parts from yielding movement, said parts and stops being movable into and out of engagement by relative rotation of said sections out of said predetermined radial relation.

3. In a synchronizing clutch member for clutches of the type including driving and driven members, one of which is shiftable axially into and out of engagement with the other, said members having complemental toothed and friction clutch faces, and the shiftable member including concentric sections, one being mounted on the other, and one section being provided with a toothed clutch face and the other being a friction section being provided with a friction clutch face, said sections being shiftable as a unit and the toothed section shiftable axially relatively to the friction section when the friction section is shifted into engaged position, said sections being also mounted to have relative rotary movement, within limits, and rotatably shiftable into a predetermined radial relation by the synchronization of the speeds, and shifting means acting on the toothed section; the combination of coupling means between the sections including a radially movable part normally interlocked with both sections and shiftable radially out of engagement with one section to permit the relative axial shifting of the sections and stops coacting with said part for preventing the radial shifting of said part, and hence blocking the relative axial movement of the sections, except when the sections are in a predetermined relative radial position.

4. In a synchronizing clutch member for clutches of the type including driving and driven members, one of which is shiftable axially into and out of engagement with the other, said members having complemental toothed and friction clutch faces and the shiftable member including inner and outer concentric sections, one being mounted on the other, and one section being provided with a toothed clutch face and the other being a friction section being provided with the friction clutch face; said sections being shiftable as a unit and the toothed section shiftable axially relatively to the friction section when the friction section is shifted into engaged position, said sections being also mounted to have relative rotary movement, within limits, and rotatably shiftable into a predetermined radial relation by the synchronization of the speeds, and shifting means acting on the toothed section; the combination of said sections formed with a radially alined socket and recess, a ball normally interlocked in both the socket and the recess, the socket having cam-shaped sides engaged with the ball, and the recess being longer in a circumferential direction than the socket and of substantially the same width in an axial direction as the socket, and a spring carried by the section formed with the recess and acting on the ball through the central portion of the bottom of the recess, the end portions of the recess serving as stops to prevent radial movement of the ball against the spring when the ball is on one side or the other of its central position and thereby preventing relative axial shifting of the sections.

5. In a synchronizing clutch member for clutches of the type including driving and driven members, one of which is shiftable axially into and out of engagement with the other, said members having complemental toothed and friction clutch faces and the shiftable member including inner and outer concentric sections, one being mounted on the other, and one section being provided with a toothed clutch face and the other being a friction section being provided with the friction clutch face, said sections being shiftable as a unit and the toothed section shiftable axially relatively to the friction section when the friction section is shifted into engaged position, said sections being also mounted to have relative rotary movement, within limits, and rotatably shiftable into a predetermined radial relation by the synchronization of the speeds, and shifting means acting on the toothed section; the combination of the outer section being formed with lengthwise slots, and the inner section having radial posts extending through the slots and of less width than the slots, and means independent of the posts and the slots for yieldingly holding the sections from relative axial movement and positively locking the sections from relative axial movement, when the sections are out of said predetermined relation.

6. In a synchronizing clutch member for clutches of the type including driving and driven members, one of which is shiftable axially into and out of engagement with the other, said members having complemental toothed and friction clutch faces and the shiftable member including inner and outer concentric sections, one being mounted on the other, and one section being provided with a toothed clutch face and the other being a friction section being provided with the friction clutch face, said sections being shiftable as a unit, and the toothed section shiftable axially relatively to the friction section when the friction section is shifted into engaged position, said sections being also mounted to have relative rotary movement, within limits, and rotatably shiftable into a predetermined radial relation by the synchronization of the speeds, and shifting means acting on the toothed section; the outer section being formed with lengthwise slots and the inner section having radial posts extending through the slots and of less width than the slots, the sections being provided with radially alined sockets and recesses respectively, balls mounted partly in both the sockets and the recesses, the sockets having cam-shaped sides tending to force the balls out of the sockets upon application of relative axial shifting force to the sections, and each recess being of greater length in a circumferential direction than the companion socket and of substantially the same width in an axial direction as the socket, spring means acting to yieldingly thrust the balls radially into the sockets and acting on the balls at the central portions of the recesses, the portions of the recesses on opposite sides of the spring means serving as stops to prevent radial movement of the balls, when the sections are out of said predetermined radial relation and the ball is located out of the central portion of the recess.

7. In a synchronizing clutch member for clutches, of the type including driving and driven members, one of which is shiftable axially into and out of engagement with the other, said members having complemental toothed and friction clutch faces and the shiftable member including inner toothed section and outer friction section, the latter being a sleeve, said sections being shiftable as a unit and the toothed section shiftable axially relatively to the friction section when the friction section is shifted into engaged position, said sections being also mounted to have relative rotary movement, within limits, and rotatably shiftable into a predetermined radial relation by the synchronization of the speeds, and shifting means acting on the toothed section; the combination of said sleeve section being formed with lengthwise slots, and the toothed section formed with radial bores alined with the slots, pins in said bores and extending through the slots and being of less width than the same, the sleeve being also formed on the inner face thereof with a socket having cam-shaped sides, and the inner section with a recess alined with the socket and of greater length than the same in a circumferential direction and of substantially the same width in an axial direction, balls located partly in the sockets and the recesses, the inner member having bores opening through the central portion only of the bottom of the recess, springs in the latter bores and acting to thrust the balls radially outward, the end portions of the recess on opposite sides, in a circumferential direction of the latter bores serving as stops to prevent radial movement inward of the balls, when the sections are out of said predetermined radial relation, and hence the balls out of alinement with the spring means.

8. In a synchronizing clutch member for clutches of the type including driving and driven members, one of which is shiftable axially into and out of engagement with the other, said members having complemental toothed and friction clutch faces and the shiftable member including inner toothed section and outer friction section, the latter being a sleeve, said sections being shiftable as a unit and the toothed sections shiftable axially relatively to the friction section when the friction section is shifted into engaged position, said sections being also mounted to have relative rotary movement, within limits, and rotatably shiftable into a predetermined radial relation by the synchronization of the speeds; the combination of said sleeve section formed with lengthwise slots, and the toothed section formed with radial bores alined with the slots, pins in said bores and extending through the slots and being of less width than the same, a shiftable collar slidably encircling the sleeve and connected to the pins, the sleeve being also formed on the inner face thereof with a socket having cam-shaped sides, and the inner section with a recess alined with the socket and of greater length than the same in a circumferential direction and of substantially the same width in an axial direction, balls located partly in the sockets and the recesses, the inner member having bores opening through the central portion only of the bottom of the recess, springs in the latter bores and acting to thrust the balls radially outward, the end portions of the recess on opposite sides in a circumferential direction, of the latter bores, serving as stops to prevent radial movement inward of the balls, when the sections are out of said predetermined radial relation and hence the balls out of alinement with the spring means.

9. In a synchronizing clutch member for clutches, of the type including driving and driven members, one of which is shiftable axially into and out of engagement with the other, said members having complemental toothed and friction clutch faces and the shiftable member including inner and outer concentric sections, one being mounted on the other, and one section being provided with a toothed clutch face and the other being a friction section being provided with the friction clutch face, said sections being shiftable as a unit and the toothed section shiftable axially relatively to the friction section when the friction section is shifted into engaged position, said sections being also mounted to have relative rotary movement, within limits, and rotatably shiftable into a predetermined radial relation by the synchronization of the speeds, and shifting means acting on the toothed section; the combination of the outer section being formed with lengthwise slots and the inner section with radial posts extending into the slots, each slot having its side walls diverging from the outer end of the slot toward its central portion and the post being of not greater width than the narrower end portions of the slot, and means independent of the posts and the slots for yieldingly holding the sections from relative axial movement and locking the sections from relative axial movement when the sections are out of said predetermined radial relation.

10. In a synchronizing clutch member for clutches, of the type including driving and driven members, one of which is shiftable axially into and out of engagement with the other, said members having complemental toothed and friction clutch faces and the shiftable member including inner and outer concentric sections, one being mounted on the other, and one section being provided with a toothed clutch face and the other being a friction section being provided with the friction clutch face, said sections being shiftable as a unit and the toothed section shiftable axially relatively to the friction section when the friction section is shifted into engaged position, said sections being also mounted to have relative rotary movement, within limits, and rotatably shiftable into a predetermined radial relation by the synchronization of the speeds, and shifting means acting on the toothed section; the combination of the outer section being formed with lengthwise slots and the inner section having radial posts extending into the slots, each slot having its side walls diverging from its ends toward the central portion and the post being of not greater width than the narrower end portion of the slot, the sections being provided with a radially alined socket and recess respectively, a ball mounted partly in both the socket and the recess, the socket having cam-shaped sides tending to force the ball out of the socket upon application of relative axial shifting force to the sections, and the recess being of greater length in a circumferential direction than the companion socket and of substantially the same width in an axial direction as the socket, spring means acting to yieldingly thrust the ball radially into the socket and acting on the ball at the central portion of the recess, the portions of the recess on opposite sides of the spring means serving as stops to prevent radial movement of the ball, when the sections are out of said predetermined radial relation and the ball is located out of the central portion of the recess.

11. In a synchronizing clutch of the type including driving and driven members, one of which is shiftable axially into and out of engagement with the other, said members having complemental toothed and friction clutch faces, and one of the members including concentric sections, one of the sections being a friction section in the form of a sleeve mounted on the other, which is the toothed section, the friction sleeve section having a ring insert in one end thereof, said ring being provided with an internal friction face for coacting with the friction face of the other member, said ring snugly fitting one end of the sleeve section and being also formed with a radial bore opening through the internal friction face and through the peripheral face of the ring, a friction shoe slidable in said bore and normally projecting beyond the internal friction face and yieldingly movable into a position flush with the same, and a spring in the bore and interposed between the shoe and the surface of the sleeve in contact with the periphery of the ring.

12. In a synchronizing clutch of the type including driving and driven members, one of which is shiftable axially into and out of engagement with the other, said members having complemental toothed and friction clutch faces, and one of the members including concentric sections, one of the sections being a friction section in the form of a sleeve mounted on the other, which is the toothed section, the friction sleeve section having a ring insert in one end thereof, said ring being provided with an internal friction face for coacting with the friction face of the other member, said ring snugly fitting one end of the sleeve section and being also formed with a radial bore opening through the internal friction face and through the peripheral face of the ring, a friction shoe slidable in said bore and normally projecting beyond the internal friction face and yieldingly movable into a position flush with the same, and a spring in the bore and interposed between the shoe and the surface of the sleeve in contact with the periphery of the ring, said sections being also mounted to have a relative rotary movement, within limits, and being rotatably shiftable into a predetermined radial relation by the synchronization of the speeds of the driving and driven clutch members, and means between the sections for coupling the same to permit axial shifting in of one section relative to the other only when the speeds are synchronized.

CARL D. PETERSON.
EDWARD W. ZINGSHEIM.
ROBERT R. BURKHALTER.